(12) United States Patent
Dudda et al.

(10) Patent No.: US 7,623,980 B2
(45) Date of Patent: Nov. 24, 2009

(54) MEASURING DEVICE WITH EVALUATION UNIT AND EXTERNAL MEMORY

(75) Inventors: Olaf Dudda, Goettingen (DE); Doug Biette, Thornton, CO (US); Christian Oldendorf, Goettingen (DE)

(73) Assignee: Sartorius, Goettingen (DE)

( * ) Notice: Subject to any disclaimer, the term of this patent is extended or adjusted under 35 U.S.C. 154(b) by 553 days.

(21) Appl. No.: 11/432,497

(22) Filed: May 12, 2006

(65) Prior Publication Data

US 2006/0206283 A1 Sep. 14, 2006

Related U.S. Application Data

(63) Continuation of application No. PCT/EP2004/012817, filed on Nov. 12, 2004.

(30) Foreign Application Priority Data

Dec. 11, 2003 (DE) ................ 103 57 856

(51) Int. Cl.
*G01C 25/00* (2006.01)
*G01D 18/00* (2006.01)
*G01F 25/00* (2006.01)

(52) U.S. Cl. ...................................... 702/104

(58) Field of Classification Search ................... 702/22, 702/25, 104, 127, 85, 91, 99, 116, 122; 324/74, 324/601; 374/172; 73/1.01
See application file for complete search history.

(56) References Cited

U.S. PATENT DOCUMENTS

| 4,672,306 A | 6/1987 | Thong |
| 4,799,559 A | 1/1989 | Muerdter et al. |
| 5,025,653 A | 6/1991 | Schuldt |
| 5,347,476 A | 9/1994 | McBean, Sr. |
| 5,892,458 A | 4/1999 | Anderer et al. |
| 6,609,076 B2* | 8/2003 | Schuh et al. ................ 702/99 |
| 7,248,182 B2 | 7/2007 | Dudda et al. |
| 7,519,499 B2* | 4/2009 | Skinner ................ 702/150 |
| 2003/0065467 A1 | 4/2003 | Schuh et al. |
| 2003/0146112 A1* | 8/2003 | Kriz ................ 205/787.5 |
| 2004/0075578 A1* | 4/2004 | Dudda et al. ............. 340/870.3 |

FOREIGN PATENT DOCUMENTS

| DE | 83 21 954.4 U1 | 3/1984 |
| DE | 3 709 717 A1 | 10/1988 |

(Continued)

*Primary Examiner*—Michael P Nghiem
(74) *Attorney, Agent, or Firm*—Sughrue Mion, PLLC

(57) ABSTRACT

A measuring device having a sensor (2) with a signal cable (5) and a connector (6) at the cable end for transmitting a sensor signal. The measuring device further includes a data memory (9) storing sensor-specific calibration data, and an evaluation unit (3) with a port (8) for connecting the signal cable (5). The sensor signal is evaluated in the evaluation unit (3) using the calibration data. In the invention, the memory (9) is enclosed in a memory housing (10) that is separate from the evaluation unit (3) and is inseparably fixed to at least one of the signal cable (5) and the connector (6) at the cable end. The memory (9) provides calibration data to the evaluation unit (3) via a transmission channel (12), separate from the signal cable (5), for transmitting the calibration data to the evaluation unit (3).

29 Claims, 4 Drawing Sheets

FOREIGN PATENT DOCUMENTS

| | | |
|---|---|---|
| DE | 3709717 A1 | 10/1988 |
| DE | 3819128 C2 | 12/1989 |
| DE | 4114921 C2 | 11/1992 |
| DE | 19540527 A1 | 5/1997 |
| DE | 19703854 A1 | 8/1998 |
| DE | 19802462 C2 | 8/1999 |
| DE | 10218606 A1 | 11/2003 |
| DE | 10237682 A1 | 3/2004 |
| GB | 2 183 342 A | 6/1987 |
| WO | 2005/061995 * | 7/2005 |

* cited by examiner

MEASURING DEVICE WITH EVALUATION UNIT AND EXTERNAL MEMORY

This is a Continuation of International Application PCT/EP2004/012817, with an international filing date of Nov. 12, 2004, which was published under PCT Article 21(2) in German, and the disclosure of which is incorporated into this application by reference.

BACKGROUND OF THE INVENTION

Apparatuses consistent with the present invention relate to a measuring device, and more particularly to a measuring device having a replaceable sensor with a permanently connected signal cable and a connector at the cable end for transmitting a sensor signal. The measuring device further includes a non-volatile electronic data memory for holding sensor-specific calibration data, and an evaluation unit with a port for connecting the signal cable. The sensor signal is evaluated in the evaluation unit using the calibration data.

In measuring devices with replaceable sensors, the respective sensor can be easily decoupled from the evaluation unit by a pin-and-socket connector. In case of a defect, which occurs most often on the sensor, but may also occur in the evaluation unit, these components can be easily decoupled and replaced by an intact component to perform a repair. When different sensors with different metrological characteristics, such as different measured quantities or measurement ranges, are used, the sensors can be replaced while using the same evaluation unit. In this case, the evaluation unit is adapted to the changed metrological characteristics of the sensor by corresponding settings. The drawback in measuring devices of this type, however, is that after every replacement of a component, particularly a sensor, the entire measuring device must be recalibrated and the result stored in the form of calibration data, usually in a data memory of the evaluation unit or a personal computer connected downstream. This is not only very time consuming and expensive but has also the drawback that the respective sensor is not safely linked to the associated calibration data. This may lead to mistakes or even the loss of calibration data regarding the sensor.

To assign identification data to a sensor of a measuring device, a data plate with a readable code is typically mounted to the sensor itself or to a component permanently connected to the sensor, such as a connection cable. For example, the German Laid Open Publication DE 37 09 717 A1 and the German Utility Model DE 83 21 954 U1 each disclose a balance (measuring device) comprising a load cell (sensor) with a permanently connected signal cable and a connector at the cable end, a display unit with an indicator field (display), and a port to connect the signal cable. A data plate with readable metrological characteristics, such as the measuring range of the load cell, information as to the date of the last official calibration, and the validity of the calibration, is inseparably fixed to the signal cable, such that the data plate is in the immediate proximity of the display of the evaluation unit when the load cell is connected and the metrological characteristics can be read as required. The drawback is that this does not ensure a reliable assignment of the respective calibration data to a given replaceable load cell. A further drawback is that a manufacturer-specific connection is required, so that it is not possible to use sensors from just any manufacturer.

From the product descriptions of Dallas Semiconductor, a measuring device is known which has a replaceable sensor with a permanently connected signal cable and a connector at the cable end, and an evaluation unit with a port for connecting the signal cable. A data memory in the form of an EPROM or EEPROM, in which sensor-specific calibration data of the sensor are stored, is disposed within the connector. This provides a relatively safe assignment of the calibration data to the sensor and simple handling by means of the common pin-and-socket connector, but requires a manufacturer-specific probe with a special connector. Arranging the data memory within the connector furthermore has the drawback that the data memory can be damaged or tampered with if the connector is open. In addition, the spatial proximity of the data memory and the associated data lines to the signal lines of the signal cable within the connector may result in an electromagnetic interaction, so that the sensor signals and/or calibration data may be corrupted during signal or data transmission.

OBJECTS OF THE INVENTION

Thus, it is an object of the present invention to provide a measuring device that ensures a safe and interference-free assignment of the calibration data to a corresponding replaceable sensor. A further object of the invention is to make it possible to use a commercially available sensor with a standard connector.

SUMMARY OF THE INVENTION

According to one aspect of the invention, a measuring device includes a feature of permanently enclosing a data memory in a separate memory housing, inseparably fixing the memory housing to the signal cable, or the connector on the cable, by a fastening element, and connecting the data memory to the evaluation unit via a separate data transmission channel for transmitting the calibration data.

By permanently enclosing the data memory in a separate memory housing, the data memory, in exemplary embodiments, an EPROM or an EEPROM, is safely protected against unauthorized access and therefore damage and replacement. Loss of, or tampering with, the calibration data is thus safely excluded. Permanent enclosure or inseparable connection should be understood to mean that the memory housing cannot be opened by a layperson without destroying it, or can be opened by authorized service personnel only with a special tool. The inseparable connection of the memory housing to the signal cable provides a safe linkage of the calibration data to the associated sensor, so that it is impossible to confuse calibration data. The inseparable connection makes it possible to use a commercially available sensor with a standard connector, which can be easily, safely, and permanently upgraded with an electronic data memory for storing sensor-specific calibration data or characteristics.

In an exemplary embodiment of the invention, the memory housing and the separate data transmission channel are fixed at a distance from one another to the signal cable, or the connector at the cable end, by means of a fastening element. By spacing the memory housing or data memory apart from the signal cable and using a separate data transmission channel for transmitting the calibration data, mutual electromagnetic interaction during signal and data transmission to the evaluation unit and thus, corruption of the sensor signal and the calibration data, is largely avoided.

In another exemplary embodiment of the invention, the replaceable sensor is a pH electrode, the calibration data of which is determined by the manufacturer in a prior calibration process on the basis of a measurement in at least one reference liquid and is stored in the associated data memory. As a result, it is possible to use an inexpensive standard evaluation unit and a standard measurement electrode to form a pH measurement device. The low-cost measurement electrode becomes a highly sensitive special sensor only with the calibration process combined with the calibration data stored in the data memory.

Apart from the calibration data, metrological characteristics of the sensor, such as the sensor type, electrical connection data, measuring range, date of the last calibration, etc., may advantageously be stored in the data memory. By reading in the characteristics, the evaluation unit can automatically configure itself, making it possible to use even completely different sensors with a single evaluation unit, e.g., a pH sensor, a temperature sensor, a conductivity sensor, or an optical sensor.

To achieve the inseparable connection, the fastening element may be configured as a permanently lockable holding clip with at least one locking projection and an associated locking recess. Suitable materials for the holding clip are either metal or a stable plastic. In a particularly exemplary embodiment, the holding clip is an integral part of the memory housing, which is a receptacle of the fastening element or holding clip and encloses the data memory. To this end, a first part of the memory housing together with a first part of the holding clip may be connected to a second part of the memory housing and a second part of the holding clip by a bending hinge, such that the housing memory and the holding clip can be permanently locked by swinging the two parts together. Thus, the memory housing is advantageously locked and simultaneously connected to the sensor cable in a single work step.

The separate data transmission channel for transmitting calibration data can be configured as a cable connection, which includes a memory cable permanently connected to the data memory with a cable connector at one end of the cable and a port disposed on the evaluation unit. However, the data transmission channel can also be configured as a wireless connection, which includes a transponder permanently connected to the data memory with a transmitter/receiver and a secondary antenna, and a primary antenna disposed on the evaluation unit. The signal cable, the memory cable and/or the data memory may be shielded against electromagnetic interference.

The shielding problem may be avoided entirely if an optical sensor is used, or a sensor that emits an optical output signal that is transmitted via a waveguide for transmitting optical signals.

To further clarify the safe assignment of the calibration data to a corresponding sensor as an enhanced feature to a user or customer, it is advantageous to mount an identical readable identification code each in the region of the sensor, i.e., on the sensor itself if possible, or at least near the sensor on the signal cable, and on the memory housing. This identification code can be, for example, a serial number fixed to the two components, e.g., in the form of an adhesive label or laser lettering.

According to yet another exemplary embodiment of the invention, the data memory can be read out as a function of the sensor signal of at least one additional sensor of a common measurement process. For example, in case of a sensor in the form of a pH electrode, the data memory can be read out as a function of the sensor signal of a temperature sensor and/or a conductivity sensor.

A microprocessor that reads out the data memory as a function of the signals of the additional sensors may be disposed downstream of the data memory toward the evaluation unit. The microprocessor can either relay the data read out from the data memory to the evaluation unit or use the data read out from the data memory to correct the sensor signal as a function of the calibration data and the data of the additional sensors and then relay it as a corrected signal to the evaluation unit. The microprocessor may be disposed inside the fastening element together with the data memory. It may also be arranged in an adapter directly connected, for example, to an additional sensor and optionally plugged into the fastening element. Correspondingly, an additional sensor may be plugged into an additional adapter. The adapters are used to produce a connection to the data memory on the one hand and the evaluation unit on the other.

Directly reading out the data memory assigned to a sensor for calibration data and other data as a function of the signals of other sensors of a common measurement process is also advantageous for conventional measuring devices, independent of the subject of this application.

BRIEF DESCRIPTION OF THE DRAWINGS

Further details of the invention will now be described by way of example, with reference to the exemplary embodiments of the measuring device according to the invention depicted in the drawings, in which.

DETAILED DESCRIPTION OF EXEMPLARY EMBODIMENTS OF THE INVENTION

Figure 1:
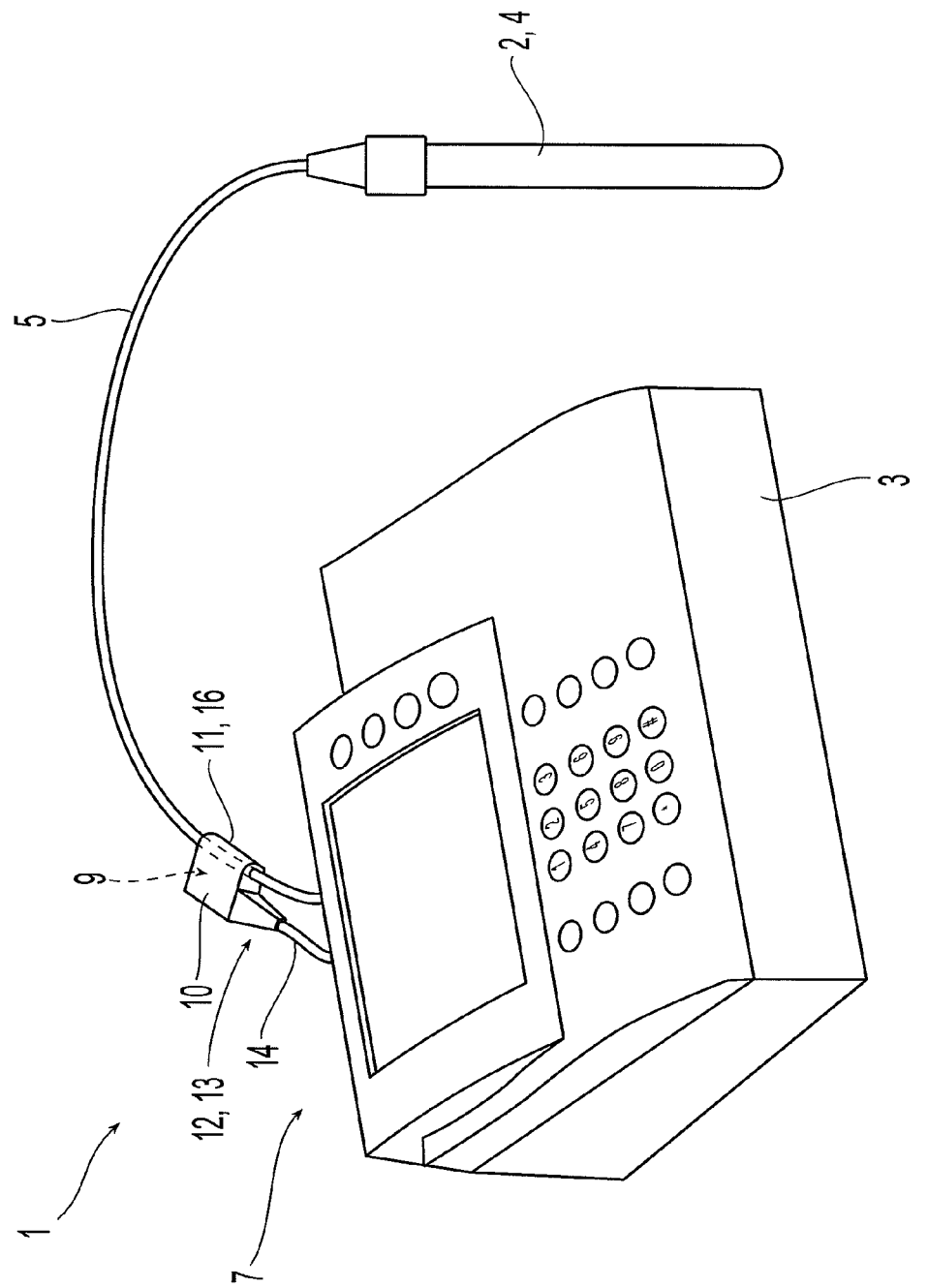
FIG. 1 is a three-dimensional representation of a first embodiment of a measuring device according to the invention.
Figure 2:
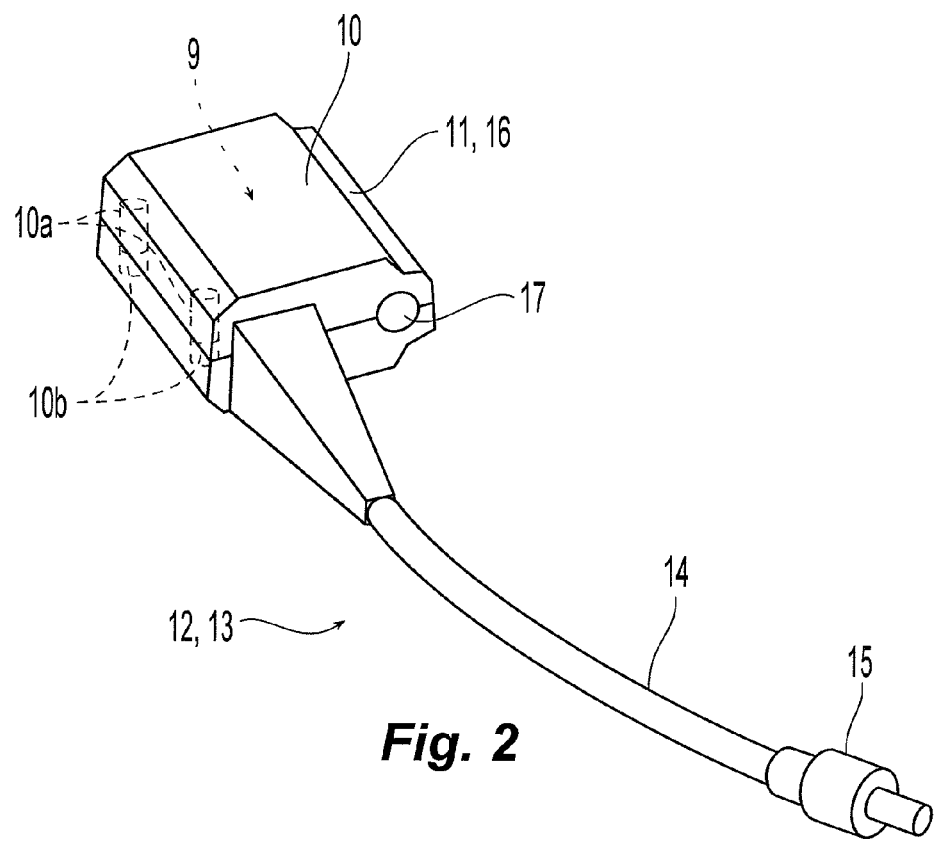
FIG. 2 is a three-dimensional representation of a fastening element with a memory cable.
Figure 4:
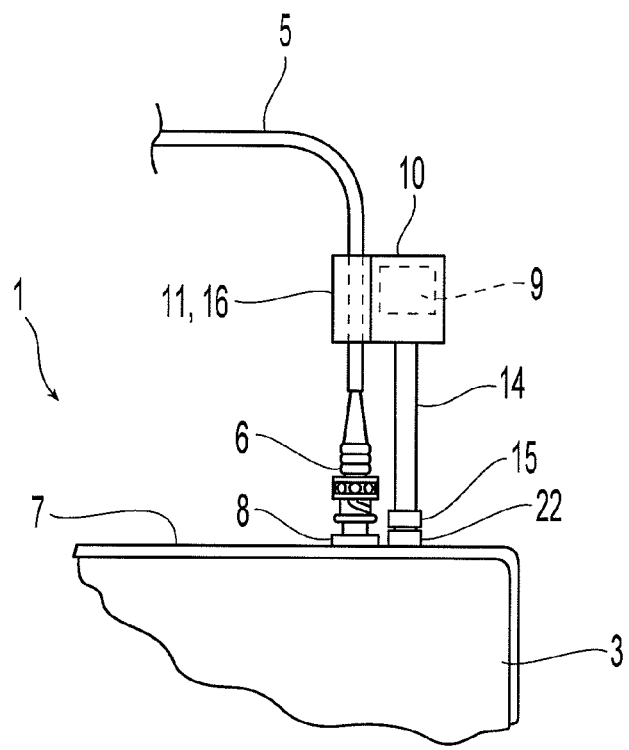
FIG. 4 is a schematic top view of the measuring device depicted in FIG. 1.

A measuring device 1 as illustrated in FIG. 1 has a sensor 2 and an evaluation unit 3 as its main components. To transmit a sensor signal, the sensor 2, which in this case is a pH electrode 4, has a permanently connected signal cable 5 and a connector 6 at the cable end (see FIG. 4) and is thus replaceable in relation to the evaluation unit 3. On the backside 7, the evaluation unit 3 has a port 8 for connecting the signal cable 5 or the connector 6. The sensor 2 is assigned a non-volatile electronic data memory 9, preferably an EPROM or EEPROM, in which the sensor-specific calibration data of the sensor 2, which are required for evaluating the sensor signal, are stored. According to the invention, the data memory 9 is permanently enclosed in a separate memory housing 10, which is configured as a receptacle of a fastening element 11 and encloses the data memory 9. With the fastening element 11 the memory housing 10 is spaced apart from, and inseparably fixed to, the signal cable 5. To transmit the calibration data to the evaluation unit 3, the data memory 9 is connected to the evaluation unit 3 via a separate data transmission channel 12, which in this case is a cable connection 13. The cable connection 13 includes a memory cable 14 permanently connected to the data memory 9 with a connector 15 at the end of the cable (see FIG. 2) and a port 22 disposed on the backside 7 of the evaluation unit 3.

The fastening element 11 is configured as a permanently lockable holding clip 16 with at least one locking projection 10a and an associated locking recess 10b. In this case, the holding clip 16 is integrally connected to the memory housing 10, such that a first part of the memory housing 10 together with a first part of the holding clip 16 communicates with a second part of the memory housing 10 and a second part of the holding clip 16 via a bending hinge 17. The holding clip 16 can be permanently interlocked with the memory housing 10 in a single work step by swinging the two parts together.

Figure 5:
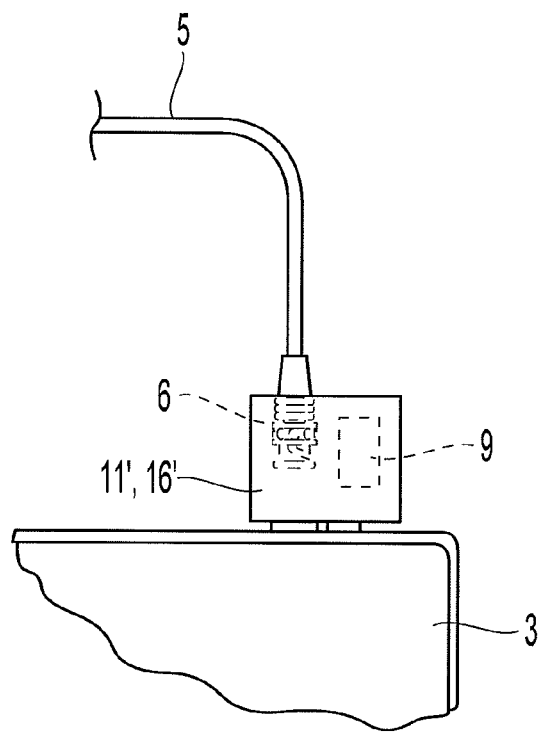
FIG. 5 is a schematic top view of the measuring device according to the invention with a fastening element on the connector at the cable end.

As shown in FIG. 5, the fastening element 11' or the holding clip 16' can also be inseparably fixed to the cable connector 6. The fastening element 11' can then be connected to the evaluation unit by its own connectors.

The arrangement of the data memory 9 according to the invention safely links the calibration data to the associated sensor 2, i.e., it is almost impossible to tamper with the calibration data or use the wrong calibration data. Electromagnetic influence or interference between the sensor signal and the calibration data, and thus corruption of these data, is largely excluded by spacing the data memory 9 apart from the signal cable 5 and by using a separate data transmission channel 12 for the transmission of the calibration data to the evaluation unit 3.

Figure 3:
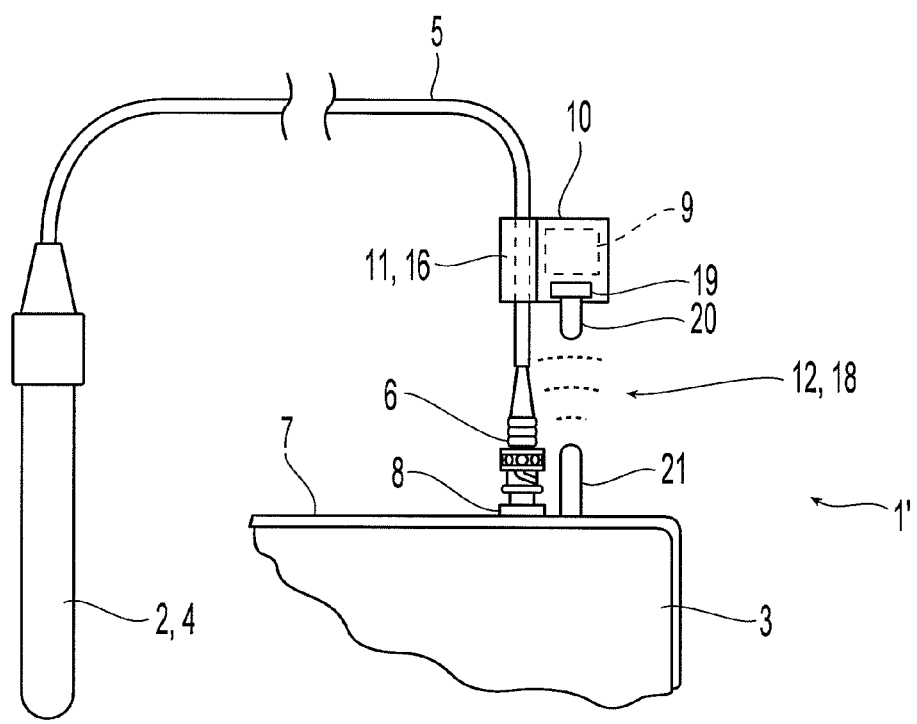
FIG. 3 is a schematic top view of a second embodiment of the measuring device according to the invention with a wireless connection.

In a second embodiment of the measuring device 1' illustrated in FIG. 3, the data transmission channel 12 is a wireless connection 18 that includes a transponder 19 permanently connected to the data memory 9 and disposed inside the memory housing 10, with a transmitter/receiver and a secondary antenna 20, and a primary antenna 21 disposed on the evaluation unit 3. To ensure interference-free transmission in this case, particularly of the sensor signal, the signal cable 5 is preferably provided with an electromagnetic shield, or a shielded coaxial cable is used.

Figure 6:
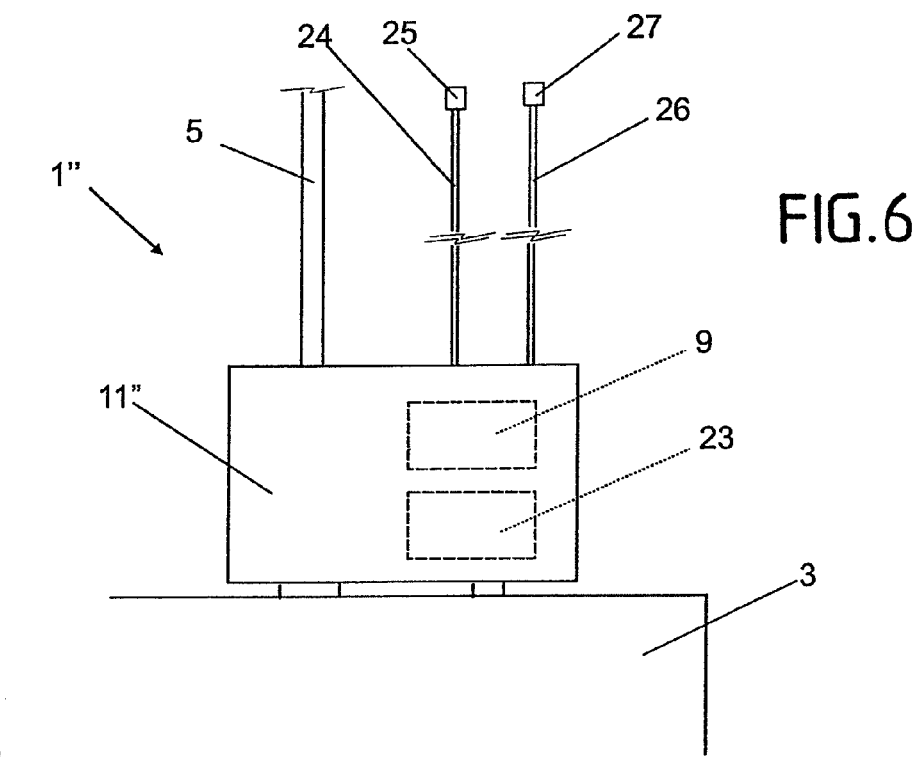
FIG. 6 is a schematic top view of a measuring device according to the invention with an additional microprocessor in the fastening element and with additional connected sensors.

In a third embodiment of the measuring device 1" illustrated in FIG. 6, a microprocessor 23 is disposed in the fastening element 11" in addition to the data memory 9. The fastening element 11" is on the one hand connected to the sensor 2 (not shown), which is configured as a pH electrode 4, via the signal cable 5. On the other hand, the fastening element 11" is connected to a second signal cable 24 leading to a temperature sensor 25 and a third signal cable 26 leading to a conductivity sensor 27.

Figure 7:
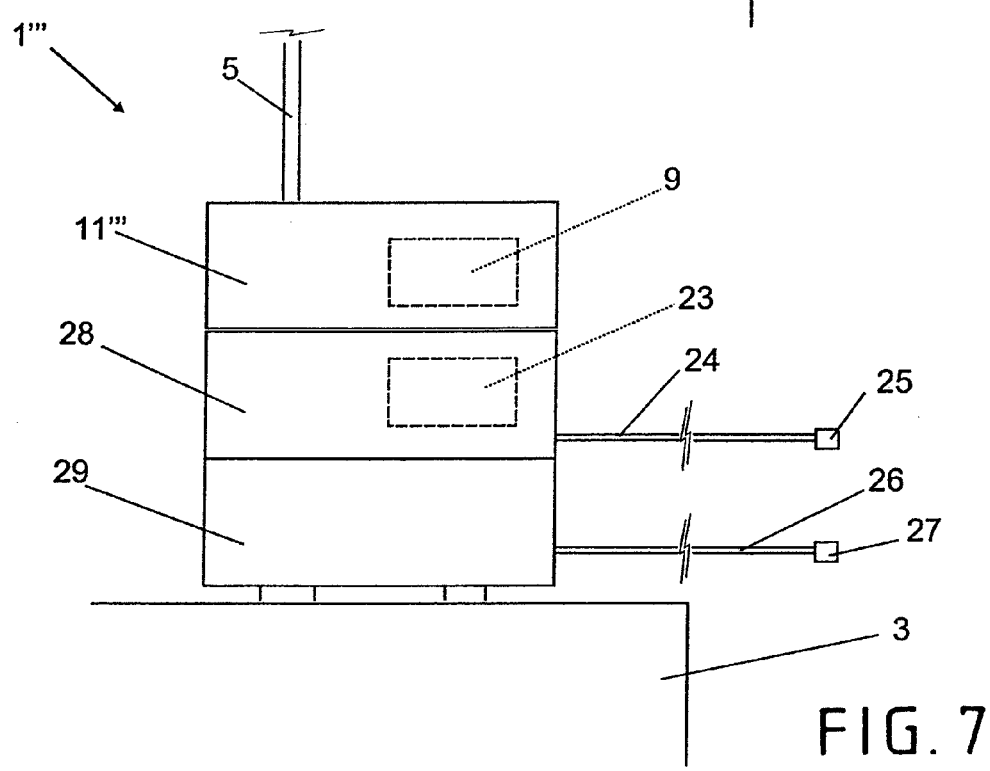
FIG. 7 is a schematic top view of a measuring device according to the invention having a first adapter with a microprocessor and a second connected sensor coupled to the fastening element, and a second adapter with a third connected sensor.

In yet another exemplary embodiment illustrated in FIG. 7, the microprocessor 23 is disposed in an adapter 28, which is connected to the fastening element 11'". In this example, the second signal cable 24 is connected to the adapter 28. If the conductivity sensor 27 is used, this sensor can be connected to the fastening element 11'" via a second adapter 29 and the first adapter 28.

The signals of the sensors 25, 27 are supplied to the microprocessor 23 directly or optionally via the data memory 9, such that the microprocessor can read out the data of the sensor 2 from the data memory 9 as a function of the signals of the sensors 25, 27 and forward them directly to the evaluation unit 3. However, the microprocessor 23 can also correct the sensor signal of the sensor 2 as a function of the calibration data stored in the data memory 9 and the data of the sensors 25, 27 and then route it as a corrected measurement signal to the evaluation unit 3.

The above description of the exemplary embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A measuring device comprising:
   a sensor having a signal cable and a connector at a cable end for transmitting a sensor signal;
   a memory operable to store sensor-specific calibration data; and
   an evaluation unit with a port for connecting the signal cable, wherein the sensor signal is evaluated in the evaluation unit using the calibration data,
   wherein the memory is enclosed in a memory housing, the memory housing being separate from the evaluation unit and inseparably fixed to at least one of the signal cable and the connector at the cable end, and wherein the memory provides calibration data to the evaluation unit via a transmission channel, separate from the signal cable, for transmitting the calibration data, and
   wherein the memory housing and the separate data transmission channel are spaced apart from and fixed to the at least one of the signal cable and the connector at the cable end by a fastening element.

2. The measuring device as claimed in Claim 1, wherein the sensor is configured as a pH electrode, the calibration data of which is determined in a prior calibration process based on a measurement in at least one reference liquid, and is stored in the memory.

3. The measuring device as claimed in Claim 1, wherein metrological characteristics of the sensor are stored in the memory.

4. The measuring device as claimed in Claim 1, wherein the memory housing is configured as a receptacle of the fastening element and encloses the data memory.

5. The measuring device as claimed in Claim 1, wherein the fastening element is configured as a permanently lockable holding clip having at least one locking projection and one associated locking recess.

6. The measuring device as claimed in Claim 5, wherein the holding clip is integrally connected to the memory housing.

7. The measuring device as claimed in Claim 1, wherein a first part of the fastening element and a first part of the memory housing are connected to a second part of the fastening element and a second part of the memory housing via a bending hinge, such that the first and second parts are permanently interlocked by closing the first and second parts together.

8. The measuring device as claimed in Claim 1, wherein the data transmission channel is a cable connection comprising a memory cable connected to the memory with a cable connector at one end and a port disposed on the evaluation unit.

9. The measuring device as claimed in Claim 1, wherein the data transmission channel is a wireless connection comprising a transponder disposed in the memory housing and connected to the memory, with a transmitter/receiver and a secondary antenna, and a primary antenna disposed in the evaluation unit.

10. The measuring device as claimed in Claim 1, wherein the sensor emits an optical output signal, and the signal cable comprises an optical waveguide transmitting optical signals.

11. The measuring device as claimed in Claim 1, wherein at least one of the signal cable and the memory has an electromagnetic shield.

12. The measuring device as claimed in Claim 1, wherein the memory is operable to be read out as a function of sensor signals of at least one additional sensor.

13. The measuring device as claimed in Claim 12, wherein the sensor is a pH electrode and the at least one additional sensor is a temperature sensor, a conductivity sensor, or a combination thereof.

14. The measuring device as claimed in Claim 12, wherein a microprocessor, which reads out the memory as a function of the sensor signals of the at least one additional sensor, is connected downstream of the memory toward the evaluation unit.

15. The measuring device as claimed in Claim 14, wherein the microprocessor relays the data read out from the memory to the evaluation unit.

16. The measuring device as claimed in Claim 14, wherein the sensor signal is corrected by the microprocessor as a function of the calibration data and the data of the at least one additional sensor and is relayed to the evaluation unit as a corrected measurement signal.

17. The measuring device as claimed in Claim 14, wherein the microprocessor is disposed in the fastening element.

18. The measuring device as claimed in Claim 14, wherein the microprocessor is disposed in an adapter.

19. The measuring device as claimed in Claim 14, wherein the at least one additional sensor is connected to at least one of the memory and the microprocessor via an adapter connectable to the fastening element.

20. The measuring device as claimed in Claim 1, wherein the memory is operable to be connected to at least one additional sensor via a signal link.

21. The measuring device as claimed in Claim 20, wherein the sensor is a pH electrode and the at least one additional sensor is a temperature sensor, a conductivity sensor, or a combination thereof.

22. The measuring device as claimed in Claim 20, wherein a microprocessor, which reads out the memory as a function of sensor signals of the at least one additional sensor, is connected downstream of the memory toward the evaluation unit.

23. The measuring device as claimed in Claim 22, wherein the microprocessor is disposed in the fastening element.

24. The measuring device as claimed in Claim 22, wherein the microprocessor is disposed in an adapter.

25. The measuring device as claimed in Claim 22, wherein the at least one additional sensor is connected to at least one of the memory and the microprocessor via an adapter connectable to the fastening element.

26. The measuring device as claimed in Claim 1, wherein the sensor is a replaceable sensor.

27. The measuring device as claimed in Claim 1, wherein the memory is a non-volatile electronic data memory that is permanently enclosed in the housing.

28. The measuring device as claimed in Claim 1, wherein the signal cable is permanently connected to the replaceable sensor.

29. A measuring device, comprising:
a sensor having a signal cable and a connector at a cable end for transmitting a sensor signal;
a memory operable to store sensor-specific calibration data;
an evaluation unit with a port for connecting the signal cable, wherein the sensor signal is evaluated in the evaluation unit using the calibration data; and
identical readable identification codes, one of the identical readable identification codes disposed in a region of the sensor and another of the identical readable identification codes disposed on the memory housing,
wherein the memory is enclosed in a memory housing, the memory housing being separate from the evaluation unit and inseparably fixed to at least one of the signal cable and the connector at the cable end, and wherein the memory provides calibration data to the evaluation unit via a transmission channel, separate from the signal cable, for transmitting the calibration data.

* * * * *